Patented Jan. 8, 1924.

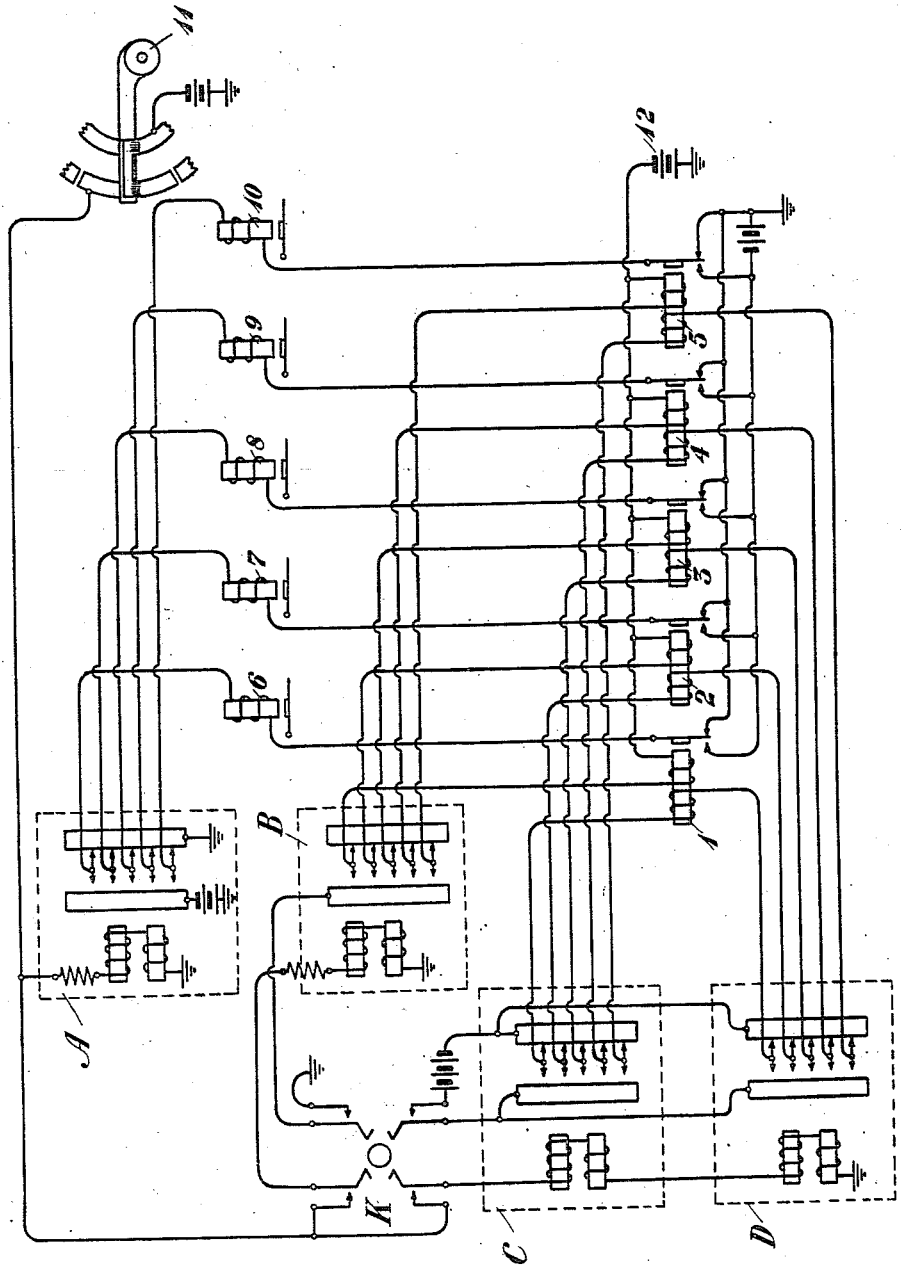

1,479,846

UNITED STATES PATENT OFFICE.

GILBERT S. VERNAM, OF BROOKLYN, NEW YORK, ASSIGNOR TO AMERICAN TELEPHONE AND TELEGRAPH COMPANY, A CORPORATION OF NEW YORK.

CIPHERING DEVICE.

Application filed June 23, 1920. Serial No. 391,215.

*To all whom it may concern:*

Be it known that I, GILBERT S. VERNAM, residing at Brooklyn, in the county of Kings and State of New York, have invented certain Improvements in Ciphering Devices, of which the following is a specification.

This invention relates to the secret communication of intelligence and finds a particularly useful application in systems for enciphering and deciphering messages such as set forth in the U. S. Patent #1,310,719, issued July 22, 1919, to G. S. Vernam and U. S. Patent #1,320,908, issued November 4, 1919, to R. D. Parker, and in the copending application of L. F. Morehouse, Serial No. 265,307, filed December 4, 1918, and assigned to the assignee of this application.

The patents and application above referred to utilize telegraph equipment and operate upon the principle of combining the code combinations representing characters of the original message with the code combinations of one or more key tapes and use the resulting code combinations to form the enciphered message. At the receiving station the code combinations of the enciphered message are combined with the code combinations of key tapes identical to those at the sending station and the resulting code combinations will then represent the characters of the original message.

It has been pointed out that the key tapes utilized at the receiving or deciphering station must be identical to those at the sending or enciphering station and furthermore these tapes must be inserted in the tape transmitters at each station at the same point on each tape so that the code combinations of the enciphered message may be recombined with the same code combinations which caused the enciphering of the message. Accordingly it has been the practice to number every tenth code combination perforated on the key tapes so that the operators at each station may know how to insert the tapes in an identical manner. The sending operator would in practice first transmit to the distant station the number of the message (the messages being arranged in numerical order) and would then transmit the address or parts not in enciphered form and would then transmit the number showing just what portion of the key tape should be inserted in the transmitter. The enciphered message would then be transmitted over the line.

It has not been the practice to transmit the key tape numbers, or information showing the receiving or deciphering operator how to insert the key tape in the transmitter, in enciphered form, but this information would be transmitted in plain text. It is the general object of this invention to provide a method of and means for transmitting this information relating to the key numbers, or insertion of the key tapes, in enciphered form, thereby providing additional means for insuring secrecy in the transmission of the messages. This may be accomplished by providing at the sending and receiving stations an additional key tape utilized solely for enciphering and deciphering the information relating to the key tape numbers, or information relating to the insertion of the key tapes in the transmitters. Other objects and features of the invention will appear more fully from the detailed description hereinafter given.

The invention is illustrated in the accompanying drawing in which is shown a circuit diagram embodying the arrangements of the invention.

In the arrangements of the invention as shown in the drawing are the tape transmitters A, C and D, which may be of a type commonly used in printing telegraph systems and which are well known in the art. These tape transmitters each include a set of contacts movable between two bus-bars, each contact being associated with a control circuit. The positioning of these contacts with respect to the bus-bars is controlled by the perforations in a tape (not shown). Stepping magnets are shown in each of the transmitters for advancing the perforated tapes. Transmitter A is controlled by the message tape, or tape containing the characters of the message. Transmitters C and D are controlled by the key tapes used for enciphering or deciphering the message. The control circuits associated with the contacts of transmitter A include the windings of the selecting relays 6, 7, 8, 9 and 10, and these control circuits are completed over the contacts of cipher relays 1, 2, 3, 4 and 5. The selecting relays 6, 7, 8, 9 and 10 may be associated with transmitting apparatus (not shown) of any desirable type whereby the code combinations set up on these relays may be transmitted out over a line, or these relays may control a local recording instrument. The control circuits associated with the contacts of transmitters C and D include the windings of the cipher relays 1, 2, 3, 4 and 5, and the positioning of these contacts serve to control these relays. Associated with transmitters C and D is the cipher cut-off key K. When the key is in a neutral position, as shown in the drawing, the control circuits for selecting relays, 6, 7, 8, 9 and 10 will be completed over the right hand contacts of the cipher relays and accordingly will be under the sole control of the contacts of transmitter A. This would be the condition of the apparatus when it is desired to transmit the characters of the message tape in its original or unenciphered form. Associated with the stepping magnet of transmitter A is the distributor 11 which at intervals will close a circuit for the stepping magnet and move the message tape ahead. The circuit from the distributor is also associated over the lower contact of key K with the stepping magnets of the cipher transmitters C and D. By throwing the key K in a downward direction the stepping magnets of the transmitters C and D will be connected in parallel with the stepping magnet of transmitter A and the tapes of all three transmitters may be stepped ahead together. When the key K is thrown in a downward position and key tapes are inserted in transmitters C and D the control circuits for the selecting relays 6, 7, 8, 9 and 10 will not be always completed over the right hand contacts of the cipher relays and hence under the sole control of transmitter A, but these control circuits may be completed over either the right or left hand contacts of the cipher relays, depending on whether the transmitters C and D have caused these cipher relays to operate or not. In other words under these conditions the code combinations of the message tape will be combined in effect with the code combinations of the key tapes and the resulting code combinations will be set up on the selecting relays 6, 7, 8, 9 and 10 to form the enciphered message. As the above principle of operation is discussed in detail in the aforementioned patents to Parker and Vernam, no further description thereof will be given.

Associated with the upper contacts of the key K is the tape transmitter B in which may be inserted an additional tape for the purpose of conveying in enciphered form to the receiving or deciphering station the information relating to the proper insertion at that station of the key tape or tapes. When the key K is thrown in an upward direction the stepping magnets of both transmitters B and A will be connected to the distributor in parallel. The control circuits associated with the contacts of transmitter B include the right hand windings of the cipher relays 1, 2, 3, 4 and 5 and are completed over a conductor leading to battery 12. Accordingly when the key K is thrown in an upward direction the selecting relays 6, 7, 8, 9 and 10 will be under the joint control of the transmitters A and B. In other words the code combinations of the message tape will be combined with the code combinations of the tape in transmitter B and a set of enciphered code combinations will be set up on the selecting relays 6, 7, 8, 9 and 10.

The sequence of operations in transmitting the message may be as follows: The cipher tapes will be inserted in transmitters C and D in certain positions and these positions as indicated by numbers will be noted. The tape suitable for the transmitter B, which will be more fully described later, will be inserted therein. The key K will be placed in a neutral position, as shown in the drawing, so that all of its contacts will be open. The message tape will then be inserted in transmitter A. A perforator may be associated with the tape to perforate it with the desired code combinations or a keyboard transmitter may be used in place of the tape transmitter A. The first portion of the message to be set up on the contacts of transmitter A will be the number of the message, as it is the practice to number the messages for purposes of convenience and comparison. The number of the message will then be transmitted in its regular and unenciphered form, except that it is the practice to utilize letters in this part of the message to represent numbers. The next portion of the message, namely the address and any portion which it is desired to transmit in unenciphered form, will then be set up on the transmitter A and transmitted in its regular and unenciphered form. The next portion of the message contains the information relating to the setting of the key tapes in the transmitters C and D, which information would be indicated by giving the numbers showing the portions of said tapes which are in the transmitters; it having been pointed out that these tapes have numbers along side of certain of the perforations, such for example as every tenth perforation. As in the case of the transmission of the number of the message previously explained, in the transmission of these numbers relating to the positioning of the key tapes letters are used in the original message to indicate numbers. Accordingly the key K would be thrown so as to close its upper contacts and the portion of the message tape containing these letters representing the numbers on the key tapes would be run through transmitter A. The tape inserted in transmitter B contains sets of arbitrarily chosen code combinations and when the key K is thrown upward the set of code combinations in this tape will combine with the code combinations of the letters set up on transmitter A and the resulting and enciphered code combinations thus set up on the selecting relays 6, 7, 8, 9 and 10 will be transmitted to the distant station. In this manner the numbers representing the positioning of the key tapes in transmitters C and D may be transmitted to the distant station in enciphered and unintelligible form. The key K will then be thrown downward to close its lower contacts and the balance of the message will be transmitted in enciphered form in the ordinary manner.

In order to decipher that portion of the message relating to the positioning of the key tapes the operator at the receiving station will be provided with a tape identical to the tape used with transmitter B. As has been pointed out the perforations on this tape are arranged in sets and each set is numbered. Thus set one would be used with message numbered one, set two with message numbered two, and so on. Accordingly to decipher that portion of the message received in enciphered form relating to the positioning of the key tapes the operator would insert that portion of the enciphered message tape in the message transmitter at the receiving station corresponding to transmitter A and would insert in the transmitter thereat corresponding to transmitter B that portion of the other tape which bore the same number as the number of the message and the resulting code combinations would be the numbers conveying the information relating to the positioning of the key tapes. The operator at the receiving station may then set the key tapes thereat according to the information thus conveyed and the message may then be deciphered in the ordinary manner.

While a separate tape transmitter, such as B, has been provided in the arrangements of the invention for use with the key tape used for enciphering the key tape number information, it is pointed out that it might be possible to merely remove the cipher or key tapes and insert this key number tape in one of the cipher transmitters while transmitting this information relating to the positioning of the key tapes, and then removing said tape and restoring the key tapes after said operation. Furthermore while reference has been made to the numbering of the key tapes at every tenth perforation, it is understood that they might be numbered in any desirable manner. Accordingly while the invention has been disclosed in certain specific arrangements, which are deemed desirable, it is understood that it is capable of embodiment in many and widely varied forms without departing from the spirit of the invention as defined in the appended claims.

What is claimed is:

1. In a secret communication system in which messages are to be transmitted by scrambling them at the sending station with characters arbitrarily recorded on a key tape and received by combining the received signals with the characters of a synchronously positioned identical key tape at the receiving station, the method of operation which consists in scrambling a part of the message including information with regard to the remainder of the message with a set of characters arranged in a predetermined order and beginning with a character determined in accordance with a prearranged plan, unscrambling the signals thus received at the receiving station by combining them with a set of characters arranged in the same order and beginning with a character determined by said prearranged plan, scrambling the characters of the remainder of the message with a set of characters arranged in a predetermined order and beginning with a character arbitrarily chosen at the sending station, and unscrambling the signals thus received at the receiving station by combining them with a set of characters arranged in the same predetermined order as at the sending station and beginning with a character determined by the previously received part of the message.

2. In a secret communication system in which messages are to be transmitted by scrambling them at the sending station with characters arbitrarily recorded on a key tape and received by combining the received signals with the characters of a synchronously positioned identical key tape at the receiving station, the method of operation which consists in scrambling a part of the message including information with regard to the remainder of the message with a set of characters arranged in a predetermined order and beginning with a character determined in accordance with a prearranged plan, scrambling the characters of the remainder of the message with a set of characters arranged in a predetermined order and beginning with a character arbitrarily chosen at the sending station, and unscrambling the signals thus received at the receiving station by combining them with a set of characters arranged in the same predetermined order as at the sending station and beginning with a character determined by the previously received part of the message.

3. In a secret communication system in which messages are to be transmitted by scrambling them with characters arbitrarily recorded on a key tape and received by combining the received signals with the characters of a synchronously positioned identical key tape at the receiving station, the method of operation which consists in positioning a key tape at the sending station in accordance with a prearranged plan, scrambling part of the message with characters determined by the key tape thus positioned, unscrambling the signals thus received by combining them with characters determined by a key tape similarly positioned at the receiving station, scrambling the characters of the remainder of the message with characters of a key tape arbitrarily positioned at the sending station, positioning a similar tape at the receiving station in the same manner as the last mentioned tape by means of information derived from the part of the message previously received, and combining the received signals corresponding to the second part of the message with characters determined by the positioning of the tape at the receiving station.

4. In a secret communication system in which the messages are scrambled and unscrambled at the transmitting and receiving stations respectively by being combined with the characters of identical key tapes positioned synchronously with each other at said stations, the method of regulating the synchronous positioning of said key tapes which consists in scrambling the information relating to the positioning of the key tape at the sending station by combining it with the characters of an additional key tape positioned at said sending station in accordance with a predetermined plan, transmitting said scrambled information to said receiving station, and unscrambling said information at said receiving station by recombining it with the characters of a key tape identical to and positioned synchronously in accordance with said predetermined plan with said additional key tape at said sending station.

5. A secret communication system comprising a sending station and a receiving station, identical key tapes positioned synchronously at each of said stations whereby the message may be enciphered and deciphered by combining it at the sending station with the characters of one key tape and recombining it at the receiving station with the characters of the other key tape, and additional identical key tapes at each of said stations having sets of characters individual to successive messages whereby the information relating to the positioning of said first mentioned key tapes may be enciphered and deciphered.

In testimony whereof, I have signed my name to this specification this 21st day of June, 1920.

GILBERT S. VERNAM.